S. BROWN.
LIQUID SUPPLY REGULATING DEVICE FOR CREAM SEPARATORS.
APPLICATION FILED MAR. 2, 1918.
1,269,254. Patented June 11, 1918.
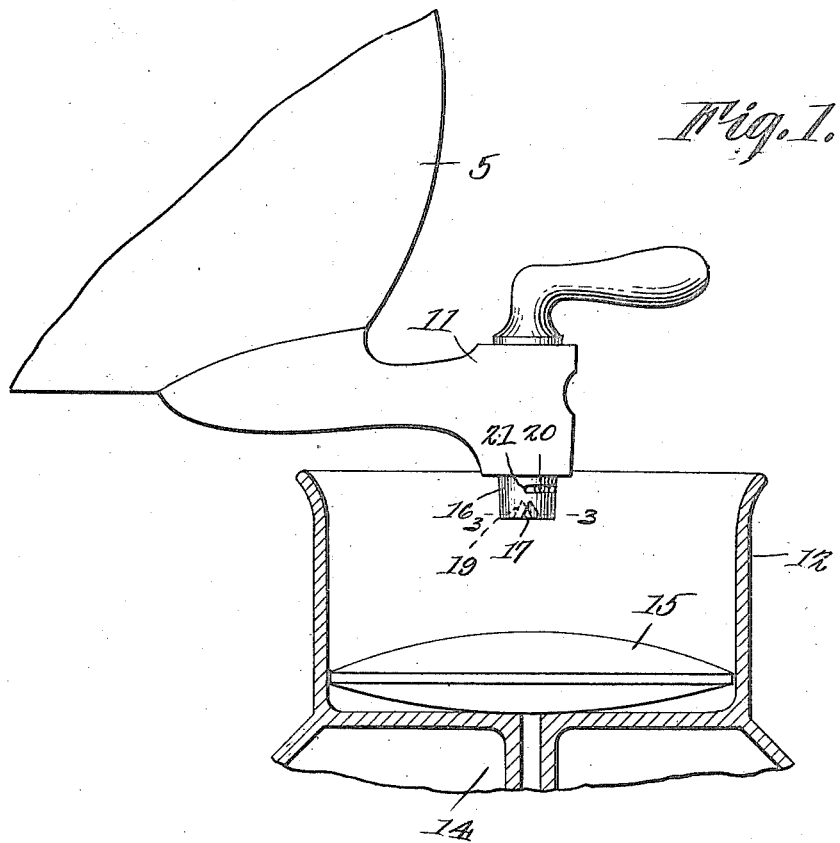
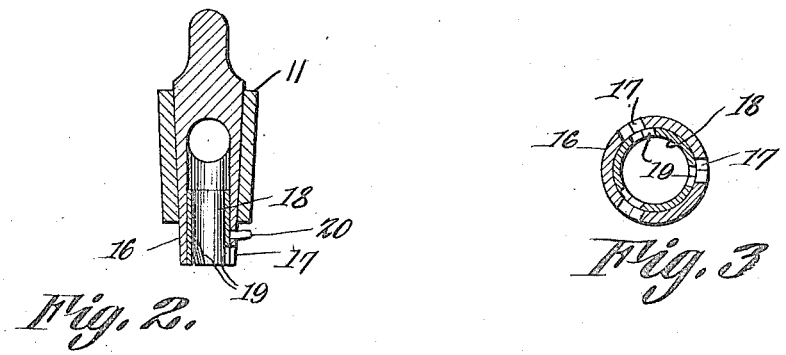
Inventor,
Samuel Brown

UNITED STATES PATENT OFFICE.

SAMUEL BROWN, OF GRAND RAPIDS, OHIO.

LIQUID-SUPPLY-REGULATING DEVICE FOR CREAM-SEPARATORS.

1,269,254.    Specification of Letters Patent.    Patented June 11, 1918.

Application filed March 2, 1918. Serial No. 219,970.

*To all whom it may concern:*

Be it known that I, SAMUEL BROWN, a citizen of the United States, residing at Grand Rapids, in the county of Wood and State of Ohio, have invented new and useful Improvements in Liquid-Supply-Regulating Devices for Cream-Separators, of which the following is a specification.

This invention relates to improvements in the valve which controls the flow of milk from the supply tank of cream separators. This valve discharges into a cup having an outlet to the separator bowl chamber, and containing a float which automatically controls the flow of milk from the valve by seating against the outlet nozzle or mouth of the latter, and thus maintains a uniform level of milk in the cup. When the supply tank is full, or the milk is at a maximum level therein, the milk discharges faster than when the level sinks. The supply of milk is therefore not steady, and the invention has for its object to overcome this objection, this being effected by constructing the valve so that the float does not completely shut off the flow when it rises to seat against the outlet end of the valve, and furthermore, by providing a means whereby this partial flow of milk may be regulated according to the level in the supply tank.

In order that the invention may be better understood, reference is had to the accompanying drawing forming a part of this specification, and in said drawing, Figure 1 is an elevation of the device;

Fig. 2 is a central vertical section of the valve, and

Fig. 3 is an enlarged cross section on the line 3—3 of Fig. 1.

Referring specifically to the drawing, 5 denotes a fragment of the milk supply tank, and 11 is the valve leading therefrom and discharging in the milk into the cup 12, which latter discharges into the separator bowl chamber, a fragment of which is shown at 14. The cup contains the usual float 15.

The valve 11 is of the ordinary turning plug type and the outlet end of the plug 16 thereof is so positioned that the float 15 may seat thereagainst when it rises with the milk in the cup 12 as the level of milk attains a certain height.

In the outlet end of the plug 16 are apertures 17 which open through the side of the plug, and hence it will be seen that when the float 15 seats against this end of the plug, the flow of milk is not completely shut off, a partial flow being maintained through the apertures 17. In order that the rate of this flow may be varied according to the variations in the level of the milk in the supply tank 5, there is mounted in the hollow of the plug a sleeve 18 having apertures 19 which are so positioned that they may register with the apertures 17 when the sleeve is properly turned, it being understood that the sleeve is rotatably mounted in the plug. In order that the sleeve may be readily operated, it is provided with a laterally extending stem 20 seating in a slot 21 in the body of the plug.

In operation, when the milk is at a maximum level in the tank 5, the sleeve 18 will be turned so that its imperforate portion covers, or partly covers the apertures 17. As the level of milk goes down, the sleeve will be turned to uncover the apertures 17 more or less until they fully register with the apertures 19, a maximum flow being now obtained, and the flow not being completely shut off when the float comes to seat against the end of the plug. By this means a steady flow of milk is obtained regardless of the level in the supply tank 5.

I claim:

In a centrifugal separator, a supply tank having an outlet valve consisting of a hollow turning plug, a receiver into which the plug discharges, a float in the receiver and positioned to seat against the outlet end of the plug, said end of the plug having side apertures, and a rotatable sleeve in the plug, said sleeve having apertures adapted to register with the plug apertures.

In testimony whereof I affix my signature.

SAMUEL BROWN.

Copies of this patent may be obtained for five cents each, by addressing the "Commissioner of Patents, Washington, D. C."